Figure 1:
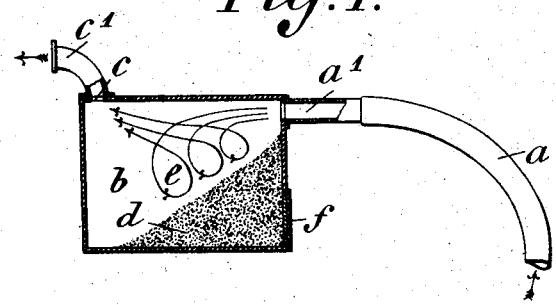

No. 835,118. PATENTED NOV. 6, 1906.
H. SÖRENSEN.
DEVICE FOR EXTRACTING DUST FROM CARPETS, FURNITURE, &c.
APPLICATION FILED MAR. 15, 1906.

Witnesses.
H. L. Ames,
B. Sommers

Inventor.
Henry Sörensen.
by Henry Orth Jr., atty.

UNITED STATES PATENT OFFICE.

HENRY SÖRENSEN, OF COPENHAGEN, DENMARK.

DEVICE FOR EXTRACTING DUST FROM CARPETS, FURNITURE, &c.

No. 835,118.     Specification of Letters Patent.     Patented Nov. 6, 1906.

Application filed March 15, 1906. Serial No. 306,221.

*To all whom it may concern:*

Be it known that I, HENRY SÖRENSEN, civil engineer, a citizen of Norway, residing at Copenhagen, in the Kingdom of Denmark, have invented certain new and useful Improvements in Devices for Extracting Dust from Carpets, Furniture, and the Like; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention refers to certain improvements in devices for extracting dust from carpets, furniture, surfaces of walls, rugs, and other materials; and its principal object is to prevent the dust from coming into direct contact with the inner surfaces of the suction-pump, and thus diminish its capacity.

It has hitherto been customary to insert in the suction pipe or hose filters for separating the dust and impurities from the air, and thus allow only comparatively pure air to pass through the suction-pump. A great inconvenience in connection with this arrangement is, however, that the suction effect gets greatly diminished through the presence of the said filters, and, furthermore, that these filters get constantly clogged and necessitate frequent cleaning. In order to obviate these drawbacks, the filters have entirely been done away with, and the dust is collected by mere action of the air at the bottom of a special receptacle, hereinafter called "dust-separator," inserted in the conduit between the suction-pump and the nozzle, from which dust-separator the dust may be removed through a suitable outlet. The dust is sucked into the said dust-separator at the top and gets whirled round and deposited at the bottom of the dust-separator, like, for instance, a snowdrift formed by a whirlwind or a deposit formed by the backflow of a river. Of course the distance between inlet and outlet and the interior relative dimensions of the dust-separator must be selected, so as to allow the action of the air to form whirls. As, however, some particles of dust or impurities may still be carried along and sucked in the direction of the pump, the upper space of the aforementioned dust-separator may be connected with the upper space of a chamber containing water which is in direct contact with the suction-piston, thus forming, together with same, a water-piston, which moves up and down, following the strokes of the suction-piston. Upon the top of the water the aforementioned particles of dust may collect, and they are carried away through a suitable outlet.

It will be seen that by the above-described arrangement the air, either purified or mixed with dust, is entirely prevented from coming into direct contact with the suction-piston and cylinder and that consequently all drawbacks from clogging of filters and diminishing of suction effect are completely obviated.

The invention is illustrated on the accompanying drawings, in which—

Figure 2:
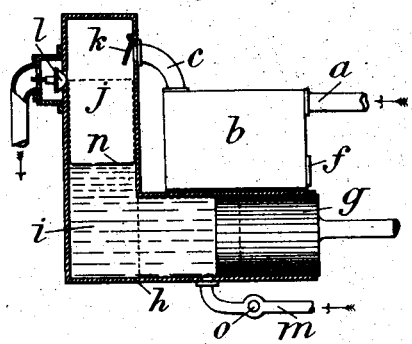
Figure 3:
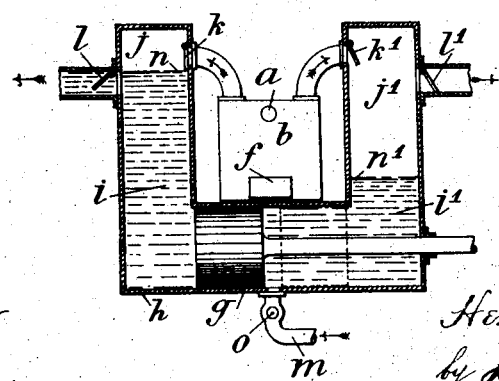

Figure 1 shows a section through the dust-separator while in function. Fig. 2 represents the dust-separator connected with a pump with water-piston. The pump is shown in section. Fig. 3 shows the dust-separator connected with a double-acting pump with water-piston.

$a$ is the suction-pipe or suction-hose, which is provided with a suitable mouthpiece or nozzle. (Not shown.) The hose $a$ communicates, by means of a suitable connecting-piece $a'$, with the uppermost space of a receptacle $b$, forming the dust-separator and which opposite to the hose $a$ is provided with an outlet $c$, communicating either direct or by means of a connecting-piece $c'$ with the suction-pump, which is not shown in Fig. 1 and which may be of any known construction. Arrows $e$ illustrate the action or whirling of the air in the dust-separator during the deposit $d$ of the dust.

The fact of the air-current being produced by mere suction, so that the air has practically but a small density, almost the totality of the dust sucked in with the air will be able to sink down and form a deposit in the bottom of the tank $b$, as shown at $d$.

$f$ is a trap or the like, through which the deposit can be easily removed and at suitable intervals.

Fig. 2 shows a form of construction in which the dust separator communicates with a special form of suction-pump. The reciprocating piston $g$ in the cylinder $h$ forms a wall against a water column $i$, which by the travel of the piston will move up and down in the suction-chamber $j$, which is provided with a suction-valve $k$ and a pressure-valve $l$. The cylinder $h$ has a water-feeding pipe $m$, leading direct into the cylinder at a place immediately in front of the piston g when the latter is in the position shown in Fig. 2—i. e., at the beginning of the return stroke. The water-inlet will consequently be covered by the piston almost during the whole of its travel. When the piston from the position shown by dotted lines moves to the right, it will toward the end of its stroke uncover the mouth of the pipe m and draw in a certain small quantity of water. This quantity of fresh water thus admitted by each stroke of the piston will partly contribute to keep the water column i cold, so that it does not become heated by the increase of temperature caused in the chamber j through the compression and will partly contribute to keep the water column i clean. The small quantity of dust that may not have been deposited in the dust-separator and that is drawn into the chamber j through the valve k will, if not passing away direct through the valve l, fall down and float on the surface n of the water column i, and as for each stroke of the piston g as much surface-water will escape through the overflow or pressure valve l as is entering into the cylinder at each suction-stroke through the pipe m the dust will be constantly removed from the surface of the water, which will consequently always present a clean surface to the air coming from the dust-separator.

The pipe m may be provided with a cock o for regulating the supply of feed-water, and the inlet of the feed-pipe m being arranged just in front of the piston when the latter is in its extreme position the ordinary use of an auxiliary feed-pump is entirely dispensed with.

The double pump (shown in Fig. 3) acts essentially in the same manner as described above. The stroke of the piston g is here so long as to uncover the mouth of the pipe m when the piston is in the two extreme positions.

When the piston assumes the extreme position to the left, as shown in full lines on Fig. 3, the quantity of fresh water drawn in will be led into the right water-column i' and cause a corresponding quantity of surface water n' at the subsequent stroke of the piston to the right to pass away through the valve l'.

When the piston assumes the extreme position to the right, as shown in dotted lines on Fig. 3, the fresh water will be led into the water column i and the surface water n will escape through the valve l at the return stroke of the piston.

Instead of water the columns i i' may consist of some other suitable liquid.

I claim—

1. In a device of the character described, the combination of a dust-receptacle communicating with a dust-intake and with a fluid-containing suction-chamber, a pump-cylinder communicating with the latter provided with a fluid-feed inlet, and a piston adapted to control said inlet.

2. In a device of the character described, the combination of a dust-receptacle having a dust-intake in the upper part thereof, an air-exhaust communicating with the opposite end of the receptacle, a fluid-containing suction-chamber communicating with the air-exhaust, a pump-cylinder communicating with the suction-chamber and provided with a fluid-feed inlet, and a piston in the pump-cylinder adapted to uncover the inlet at the extreme position thereof.

3. In a device of the character described, the combination of a dust-receptacle having a dust-intake at one end of the upper part thereof and an air-exhaust port at the opposite end, a valve in said port, a fluid-containing suction-chamber communicating with the receptacle through the exhaust-port, a pump-cylinder communicating with the suction-chamber and provided with a fluid-feed inlet, a piston in the pump-cylinder adapted to control the inlet, and a valved outlet-port in the suction-chamber.

In testimony that I claim the foregoing as my invention I have signed my name in presence of two subscribing witnesses.

HENRY SÖRENSEN.

Witnesses:
ERNEST BOUTARD,
J. P. PFNAUSTANZ.